United States Patent [19]

Sell

[11] Patent Number: 5,676,380
[45] Date of Patent: Oct. 14, 1997

[54] VENTING PISTON RING

[75] Inventor: Leslie J. Sell, Bothell, Wash.

[73] Assignee: Ingersoll-Rand Company, Woodcliff Lake, N.J.

[21] Appl. No.: 720,740

[22] Filed: Oct. 2, 1996

[51] Int. Cl.⁶ ............................................. F16J 9/12
[52] U.S. Cl. .................. 277/29; 277/215; 91/51; 92/240
[58] Field of Search .................. 277/29, 215, 216, 277/165; 92/240, 248; 91/47, 51

[56] References Cited

U.S. PATENT DOCUMENTS

| | | | |
|---|---|---|---|
| 1,423,943 | 7/1922 | Jones | 277/215 |
| 2,564,025 | 8/1951 | Morton | 277/216 |
| 2,591,920 | 4/1952 | Colvin | 277/216 |
| 3,396,976 | 8/1968 | Reinhoudt et al. | 277/216 |
| 3,704,893 | 12/1972 | Hill | 277/216 |
| 4,557,488 | 12/1985 | Litherland | 277/215 |
| 4,592,559 | 6/1986 | Harvey | 277/215 |
| 4,681,326 | 7/1987 | Kubo | 277/215 |
| 4,736,586 | 4/1988 | Kawajiri et al. | 277/216 |
| 5,275,422 | 1/1994 | Rehfeld | 277/216 |
| 5,450,783 | 9/1995 | Binford | 277/216 |
| 5,524,904 | 6/1996 | Willi et al. | 277/29 |

*Primary Examiner*—Scott Cummings
*Attorney, Agent, or Firm*—Walter C. Vliet

[57] ABSTRACT

A venting piston ring is provided with ports extending partly through the ring outer surface which cooperate with the end edge of a cylinder wall to vent the cylinder volume while intermediate surface lands between ports maintain ring to cylinder contact and alignment.

7 Claims, 2 Drawing Sheets

VENTING PISTON RING

BACKGROUND OF THE INVENTION

This invention relates generally to cylinder/piston combinations and more particularly to a piston ring which permits exhaust or venting of a compressed gas in a cylinder, for example, in an air motor. To achieve efficient operation, the compressed air that is introduced into a cylinder of the piston air motor must be exhausted from the cylinder before the piston commences its return stroke. This is often accomplished by venting the cylinder through a rotary valve mechanism which also supplies the air. A second, more efficient, method is to allow the air to escape directly through a series of holes in the cylinder wall which the piston ring crosses as the piston approaches the bottom of its stroke.

To avoid becoming damaged, conventional piston rings and particularly plastic piston rings require that the holes in the cylinder be carefully deburred and chamfered around the edges, making the deburring operation expensive and unreliable.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a venting piston ring including a ring disposed about the circumferential periphery of a piston for reciprocation therewith within a cylinder so as to form a varying volume chamber within the cylinder; and the ring being further provided with a means for sealing the varying volume chamber when disposed within the chamber and a means for venting the varying volume chamber when the ring is withdrawn partially from the cylinder.

The foregoing and other aspects will become apparent from the following detailed description of the invention when considered in conjunction with the accompanying drawing figures.

BRIEF DESCRIPTION OF THE DRAWING FIGURES

FIG. 1 is an isometric view of a piston in a cylinder with a section of the cylinder wall removed to view the essential details of the present invention embodied in the piston ring and piston; and FIG. 2 is an isometric view of the piston ring according to the present invention showing the essential details of its construction.

DETAILED DESCRIPTION

The present invention eliminates the need for holes in the cylinder wall. Instead the air compressed in the cylinder is allowed to vent or exhaust through a series of flutes in the piston ring. The flutes provide a direct escape path when the piston ring has travelled slightly beyond the end of the cylinder at the bottom of the piston stroke.

Figure 1:
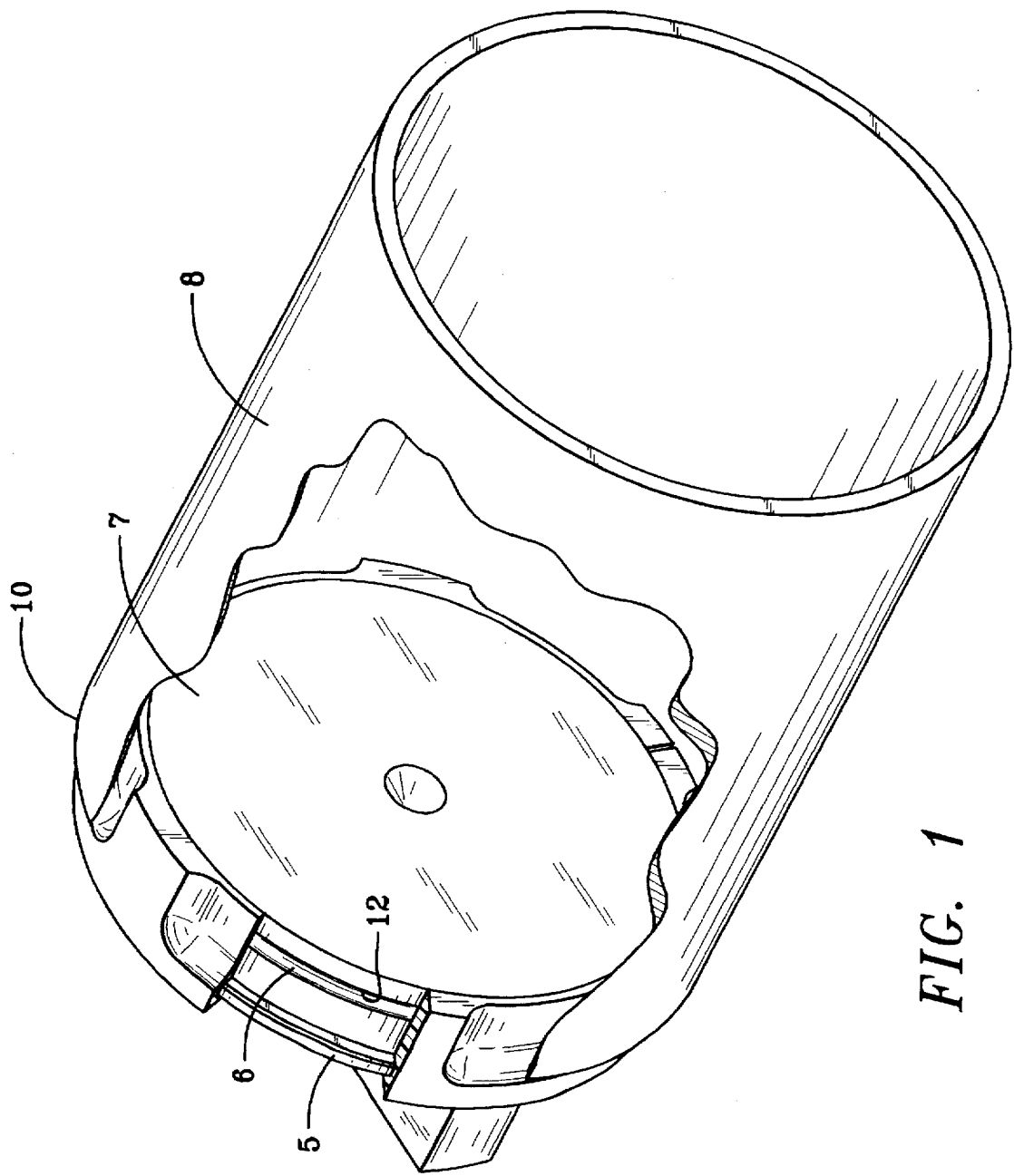

FIG. 1 shows a piston ring 1 installed on a piston 7 at the bottom of its stroke in a cylinder 8. In this position lands 1A through 1F on the piston ring support and guide the piston in the cylinder bore. Also in this position the flutes 2 are just below the bottom of the cylinder edge 10 allowing the compressed air to vent to the atmosphere through the open flutes 2 thereby allowing compressed air to vent or exhaust to atmosphere. When the piston commences its upstroke, the bottom part 11 of the piston ring enters the cylinder and closes the venting or exhaust path.

Figure 2:
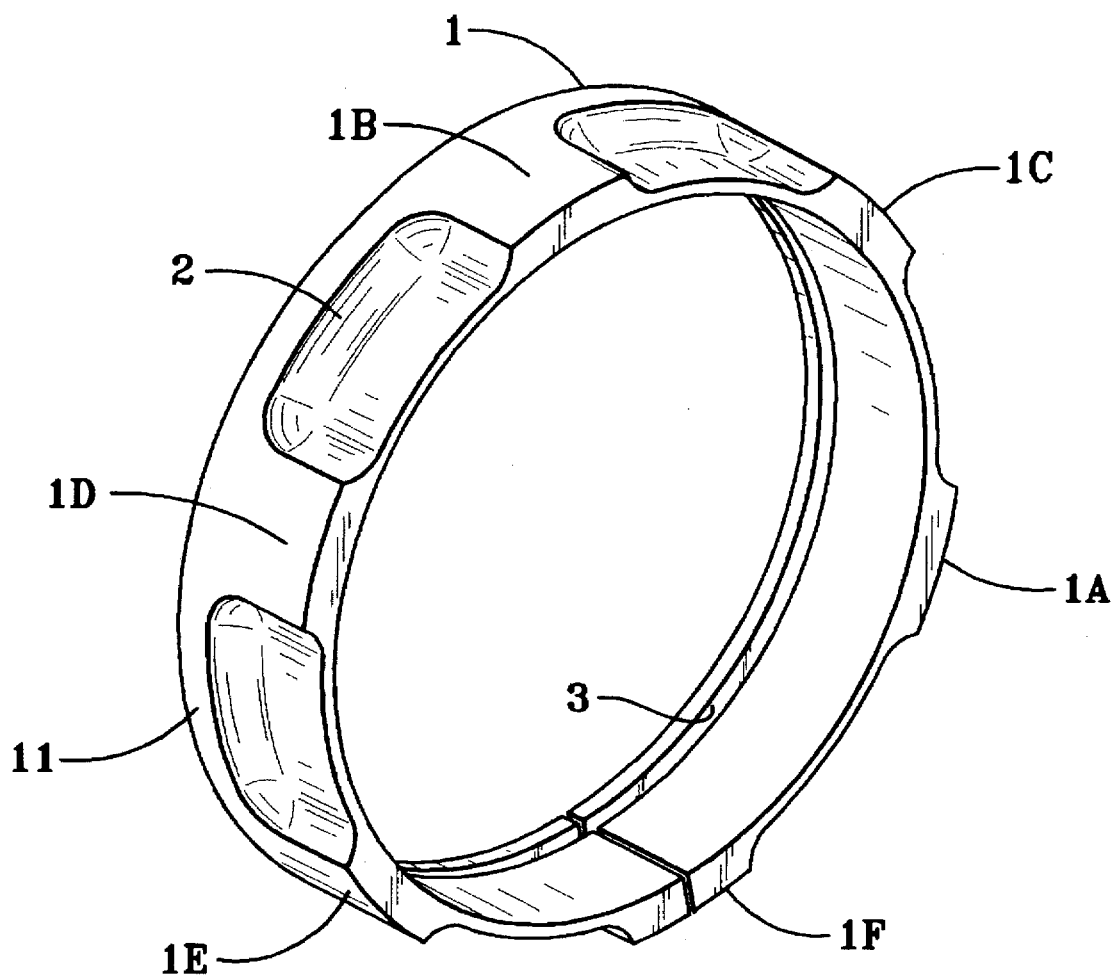

Referring now to FIGS. 1 and 2, according to the present invention a molded plastic piston ring 1 having flutes 2 that extend partway through the outer circumference is provided for installation on the outer circumference of a piston 7 which reciprocates in a cylinder 8. An internal groove 3 on the piston ring 1 engages a lip 5 on the piston 7, as best seen in FIG. 1. The piston ring is provided with a split 4 which allows the piston ring to expand and engage lip 5 on piston 7. An "O" ring 6 installed in a groove 12 on the piston acts to expand the piston ring against the cylinder wall to form a sliding seal between the piston ring and the cylinder wall.

Having described my invention in terms of a preferred embodiment, I do not wish to be limited in the scope of the invention except as claimed.

What is claimed is:

1. A piston ring in combination with a piston operating within a defined cylinder wall for alternately sealing and venting compressible fluid in and from a varying volume chamber formed by said reciprocating piston within a cylinder comprising:

a ring disposed about the circumferential periphery of a piston for reciprocation therewith within a cylinder so as to form a varying volume chamber for compressible fluid within said cylinder; and said ring being further provided with a means for sealing said varying volume chamber when disposed within said chamber during a portion of a reciprocating cycle and a means for venting said varying volume chamber when said ring is withdrawn partially from said cylinder at one end of said reciprocating cycle.

2. A piston ring for sealing a reciprocating piston according to claim 1 wherein:

said means for sealing said varying volume chamber further comprises a continuous portion of said ring about its circumference.

3. A piston ring for sealing a reciprocating piston according to claim 1 wherein:

said means for venting said varying volume chamber further comprises a plurality of flutes in the ring surface extending partially through a circumferential surface of said ring last in contact with said cylinder on withdrawal of said piston from said cylinder.

4. A piston ring for sealing a reciprocating piston according to claim 1 wherein:

said ring is a split ring provided with a means for securing said ring to said piston.

5. A piston ring for sealing a reciprocating piston according to claim 4 wherein:

said means for securing said ring to said piston further comprises a groove on the inner surface of said ring and a cooperating lip on said piston.

6. A piston ring for sealing a reciprocating piston according to claim 1 wherein:

said ring is expanded into sliding and sealing contact with said cylinder by means of a rubber "O" ring disposed in a groove on said piston.

7. A piston ring for sealing a reciprocating piston according to claim 1 wherein:

said reciprocating piston and cylinder are installed in an air motor for a winch.

* * * * *